(12) United States Patent
Mansfield et al.

(10) Patent No.: US 7,860,983 B1
(45) Date of Patent: Dec. 28, 2010

(54) ENTERPRISE IDENTITY ORCHESTRATION SERVER

(75) Inventors: Andrew N. Mansfield, Goose Creek, SC (US); Michael Anthony Ramirez, Moncks Corner, SC (US); Russell Clayton Coleman, Goose Creek, SC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 186 days.

(21) Appl. No.: 12/189,531

(22) Filed: Aug. 11, 2008

(51) Int. Cl.
*G06F 15/16* (2006.01)

(52) U.S. Cl. .................. 709/227; 709/200; 717/100; 717/168; 707/703

(58) Field of Classification Search .............. 709/200, 709/227; 707/103; 717/100, 168
See application file for complete search history.

(56) References Cited

U.S. PATENT DOCUMENTS

| | | | |
|---|---|---|---|
| 7,150,004 B2 | 12/2006 | Russell et al. | |
| 7,219,154 B2 | 5/2007 | Blakley, III et al. | |
| 7,254,634 B1 * | 8/2007 | Davis et al. | 709/228 |
| 2005/0044197 A1 * | 2/2005 | Lai | 709/223 |
| 2006/0229925 A1 * | 10/2006 | Chalasani et al. | 705/8 |
| 2007/0033194 A1 | 2/2007 | Srinivas et al. | |
| 2007/0285993 A1 | 12/2007 | Bindewald et al. | |
| 2008/0101252 A1 * | 5/2008 | Bui | 370/252 |
| 2009/0193433 A1 * | 7/2009 | Maes | 719/315 |

OTHER PUBLICATIONS

Len Seligman, Arnon Rosenthal, "XMLs Impact on Databases and Data Sharing". Mitre Corporation, IEEE, Jun. 2001, pp. 59-67.*

* cited by examiner

*Primary Examiner*—John Follansbee
*Assistant Examiner*—Anthony Mejia
(74) *Attorney, Agent, or Firm*—Arthur K. Samora; Kyle Eppele (57) ABSTRACT

A network server architecture that provides network integration and control functions is disclosed. The architecture includes a virtual directory server (VDS) and an identity provider. The VDS provides an interface for access of external user stores, external business rules and external service discovery configurations. The identity provider allows for a client interface for transfer of that information to the client. A rules engine and a service discovery provider configuration module are integrated into the VDS. The rules engine processes the external business rules that have been retrieved. The service discovery control module allows for retrieval of external definitions and information about the users stores that the VDS supports and update of the service discovery control module, even while the architecture is online. The service discovery control module is in a UDDI format, although other formats could be used.

13 Claims, 7 Drawing Sheets

ENTERPRISE IDENTITY ORCHESTRATION SERVER

FEDERALLY-SPONSORED RESEARCH AND DEVELOPMENT

This invention (Navy Case No. 098782) is assigned to the United States Government and is available for licensing for commercial purposes. Licensing and technical inquiries may be directed to the Office of Research and Technical Applications, Space and Naval Warfare Systems Center, San Diego, Code 2112, San Diego, Calif., 92152; voice 619-553-2778; email T2@spawar.navy.mil.

FIELD OF THE INVENTION

This disclosure relates to network servers and related software, including network server software implementing virtual directories.

GLOSSARY OF TERMS

For ease of reference, and to facilitate understanding of the written description of the claimed invention, the following glossary provides definitions for the various abbreviations and notations used throughout this patent application. The acronyms and terms are listed in the order in which they appear in this application:

VDS—Virtual Directory Server is a directory server that provides a virtual interface to many different user stores.

LDAP—Lightweight Directory Access Protocol is an application protocol for querying and modifying directory services running over TCP/IP TCP/IP—TCP/IP is an acronym for "Transport Control Protocol/Interface Program". TCP/IP protocols are a collection of protocols (a set of rules) that allow computers to communicate and that facilitate computer networking.

UDDI—Universal Description Discovery and Integration is a platform-independent, XML-based registry for businesses worldwide to list themselves on the Internet.

XML—Extensible Markup Language is a general-purpose specification for creating custom markup languages. It is classified as an extensible language because it allows its users to define their own elements. Its primary purpose is to facilitate the sharing of structured data across different information systems via the internet.

SOAP—Simple Object Access Protocol is a protocol for exchanging XML-based messages over computer networks, normally using HTTP/HTTPS. SOAP is a TCP/IP protocol.

HTTP—Hypertext Transfer Protocol is a communications protocol for the transfer of information on intranets and the internet. HTTP is a TCP/IP protocol.

JTA—Joint Technical Architecture is a set of essential architecture standards that define the service areas, interfaces, and standards applicable to all Department of Defense (DoD) systems; its use is mandatory for the management, development, and acquisition of new or improved IT systems throughout DoD.

EBXML—Electronic Business using XML is a family of XML based standards used to provide an open, XML-based infrastructure that enables the global use of electronic business information in an interoperable, secure, and consistent manner by all trading partners.

STS—Security Token Service is an online identity management service provided by Microsoft® that facilitates authentication functions for both users logging in to websites and website administrators that are authenticating prospective users.

SAML—Security Assertion Markup Language is an XML-based standard for exchanging authentication and authorization data between security domains, that is, between an identity provider (a producer of assertions) and a service provider (a consumer of assertions).

Kerberos—Kerberos is a computer network authentication protocol that allows individuals communicating over a non-secure network to prove their identity to one another in a secure manner JSR-94—Java Specification Request (JSR) describes proposed specifications and technologies to be added to the Java platform. JSR-94 is a JSR that executes one or more business rules in a runtime production environment. The rules might come from legal regulation ("An employee can be fired for any reason or no reason but not for an illegal reason"), company policy ("All customers that spend more than $100 at one time will receive a 10% discount"), or other sources.

JDBC/RDBMS—An Application Program Interface (API) for the Java programming language that defines how a client may access a database. It provides methods for querying and updating data in a database.

DSML—Directory Service Markup Language is a representation of directory service information in XML syntax.

JDBC—Java Database Connectivity (JDBC) is an application program interface for the Java programming language that defines how a client may access a database. It provides methods for querying and updating data in a database.

tModel—tModel is a data structure representing a service type (a generic representation of a registered service) in the UDDI registry. More information about tModels can be found at: http://uddi.org/taxonomics/UDDI_Registry_tModels.htm.

BACKGROUND

In general, VDS approaches in the prior art include similar features. For example, many VDS approaches offer aggregation of user stores, and many VDS approaches provide an LDAP interface to allow for communication between clients.

Many VDS approaches have similar limitations, including the inability to offer a uniform authentication interface: While most VDS products offer the ability to interface with any supported user stores, the bind status and control codes vary greatly depending on the backend software and are left to the client software to decipher.

VDS approaches also typically lack a coherent business rules layer: While most VDS products offer the ability to insert business code into the software via "interceptors", an extensible rules layer which allows for declarative rules defined in natural English statements has not been developed as of yet.

VDS approaches are also very inflexible with respect to dynamic changes in configuration files. While most VDS products offer an application or configuration file where static definitions and information about the supported user stores can be input, the configuration is local to the server and must be taken offline to be updated. This is largely because no current product offers critical integration with the de facto enterprise discovery mechanism, provided by a service discovery mechanism, such as the UDDI service discovery protocol, for example.

Another disadvantage of typical VDS approaches is that while it is possible to discover services, the nature of the discovered services is not always apparent. Thus, an address and connectivity to a device at the address may be obtained, but the nature of services offered by that device through the connectivity is not provided. In some cases, an initial connection response or directory entry is provided, but if the nature of the connection or device is not apparent from the initial connection response or directory entry, then it unclear whether the address includes the desired services.

SUMMARY

The above disadvantages are mitigated by aspects of the present invention, wherein integration and control of network control functions are provided using an Enterprise Identity Orchestration (EIDO) server architecture having an identity provider, a virtual directory server, and a rules engine and service discovery provider configuration module that are integrated into the virtual directory server. The identity provider includes a servlet container containing at least one client interface connector and an identity proxy to facilitate transfer of information from the EIDO server to the client/consumer via the connector. The connectors are known in the prior art and include a SOAP binding, an HTTP binding and a WS-Trust/Infocard provider by Microsoft. The servlet container also includes a custom interface, to allow for connection to client for transfer of information via emerging protocol and standards that are not yet fully known or developed. The identity provider facilitates communication in that it is the only portion of the servlet container that needs to be modified to switch between bindings.

The virtual directory server includes an interceptor container for communicating with a rules server, an application interface container containing a plurality of application interfaces, and a connector container containing at least one connector. In the virtual directory server, the interceptor container accesses business rules form a remote rules server. The interceptor container further contains a rules engine and a custom interceptor, which manipulates the business rules if required to do so.

In similar fashion to the servlet container, the virtual directory server has a directory connector container, which contains a plurality of connectors for interfacing with user stores for retrieval of information and data. The directory connector container includes server "standard" connectors, such as JDBC/RDBMS, DSML and LDAP connectors, as well as a custom connector which can be modified to facilitate connection to user stores with a connector that is not yet standard.

As mentioned above, the virtual directory server also includes an internal service discovery mechanism. The service discovery mechanism allows for online updates to the definitions and information about the users stores that the virtual directory server supports. The service discovery mechanism is in a UDDI format, although other formats could be used, provided the service discovery mechanism provides the same functions with the virtual directory server and EIDO server architecture.

BRIEF DESCRIPTION OF THE DRAWINGS

The novel features of the present invention will be best understood from the accompanying drawings, taken in conjunction with the accompanying description, in which similarly-referenced characters refer to similarly referenced parts, and in which.

DETAILED DESCRIPTION OF THE PREFERRED EMBODIMENTS

Overview

A server that provides an integration and control mechanism for identity providers is discussed herein. The integration and control functions are accomplished by integrating service discovery services and an internal rules engine into a virtual directory server (VDS). The technique implements what is referred to herein as an Enterprise Identification Orchestration (EIDO) server architecture. The EIDO server architecture is designed to aggregate authentication mechanisms into a singled, unified set of components that remains extensible and adaptable. The service discovery mechanism enables enterprise entities to publish service listings and define how those listings can be consumed. By way of non-limiting example, the service discovery services can be provided by UDDI storage. Thus, the server architecture integrates: 1) Identity Provider functions; 2) Service Discovery functions; and, 3) Rules Engine functions. The manner of integration is more fully described below.

Additionally, the EIDO server architecture extends the capability of current directory servers and virtual directory servers to support Federated Identity. Federated Identity is an infrastructure design that enables identity information to be passed between multiple network enclaves, system environments, and/or computer systems of the Federal Government. Department of Defense, Department of Navy, and other Federal Government agencies all maintain their own separate user directories with distinct attributes. The server architecture creates a unified enterprise view of any subordinate directory, normalizes attributes, and standardizes interfaces according to the JTA. In a cross-domain environment, the server architecture includes software components and management processes that allow for rapid integration of directory services into a unified environment, which further supports net-centric war-fighting capabilities and Services Oriented Architecture (SOA).

To support additional enterprise capabilities, the EIDO server architecture integrates with discovery services, including but not limited to UDDI or EBXML standards and specifications, which enables directories within the enterprise to be defined, discovered, and used with minimal integration from end user systems. To do this, the server architecture works in the following manner:

1) The identity provider first chooses the consumption rules which are applicable to their system, by either choosing existing rules or creating new rule definitions, which are stored in a remote rules server.
2) New identity providers then register via a common discovery mechanism, such as UDDI or EBXML. Relevant information to the user store, such as credentials, integration data and configuration, and references to the rules created in step 1 is registered in the discovery store in a common identity provider taxonomy or schema.

At this point, all information required for consuming the data provider is stored external to the EIDO server architecture, making stateless server architecture clustering possible.
3) The server architecture subscribes to the discovery mechanism for new identity providers and provides configuration updates to existing providers.
4) When the EIDO server architecture attempts to connect to an identity provider, it searches for the necessary configuration information from the discovery mechanism. The discovery mechanism provides the server architecture with the necessary credentials, endpoints, mapping and server configuration, as well as references to the consumption rules.
5) The server architecture begins using the identity provider to find identity information in conjunction with the rules retrieved from the remote rules server.
6) Identity consumers retrieve information from one of two interfaces, depending on needs. An example system uses LDAPv3 for clients that have processing/bandwidth/legacy concerns; or a STS for those clients that can consume and process identity tokens such as those issued in SAML, Kerberos or other token formats.

The server architecture provides several advantages, including unification of the authentication scheme, integration of a business rules layer, and development of a dynamic configuration mechanism. The unification of the authentication scheme obviates the need to account various encodings offered by different identity providers (known as the "Authentication Interceptor"). The integration of a business rules layer allows declarative modification of user information and server operation per business needs (known as the "Mapping Interceptor"). The development of a dynamic configuration mechanism through the integration with a service discovery mechanism and rules server avoids the requirement to take servers offline to update server-specific static configuration files, as is the case in the prior art.

High Level Architecture

Figure 1:
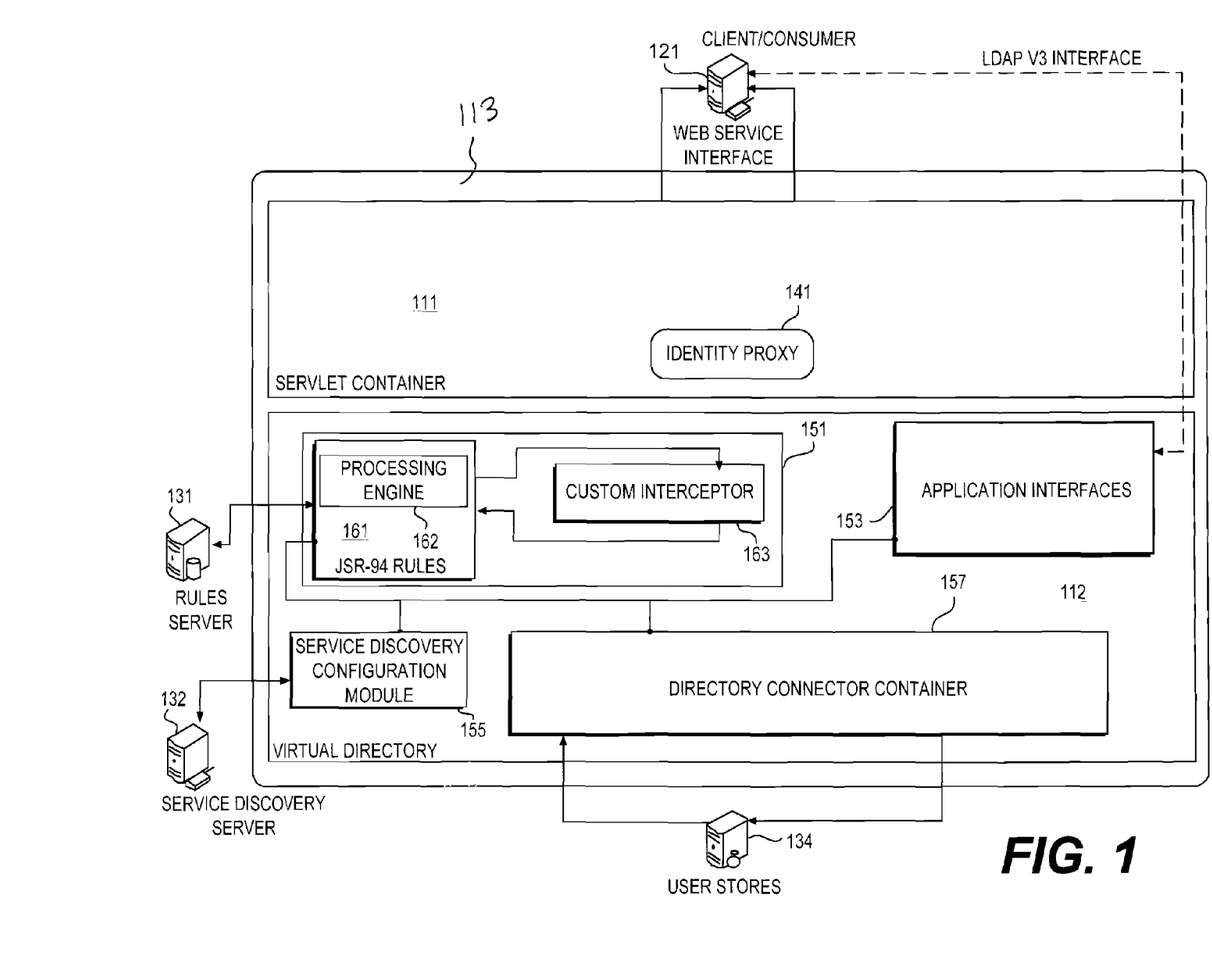
FIG. 1 is a diagram illustrating the high level architecture of an EIDO server architecture of the present invention.

FIG. 1 is a diagram illustrating an example of a high level architecture of an EIDO server network 113. In FIG. 1, many sub-components have been left out; these subcomponents will be described in greater detail when referring to FIGS. 2-4. Also, the FIG. 1 architecture, unless specified as custom, is a generalized architecture that could apply to a variety of systems. The reference implementation of the server architecture was built using a Java platform, which implements a Java virtual machine (Java and J2EE, are licensed trademarks of Sun Microsystems, Inc.). An alternative to the Java platform may be used either in lieu of the Java platform, or in addition to the Java platform.

The EIDO architecture 113 includes a servlet container 111 and a virtual directory server 112. Servlet container 111 relies upon an identity proxy 141 to normalize interfaces between servlet container 111 and client/consumer 121 via web service interface. Stated differently, client/consumer 121 communicates with EIDO architecture either directly through a web interface to the servlet container 111 or indirectly through the LDAPV3 interface to the application interfaces 153, which is incorporated within virtual server 112.

Figure 2:
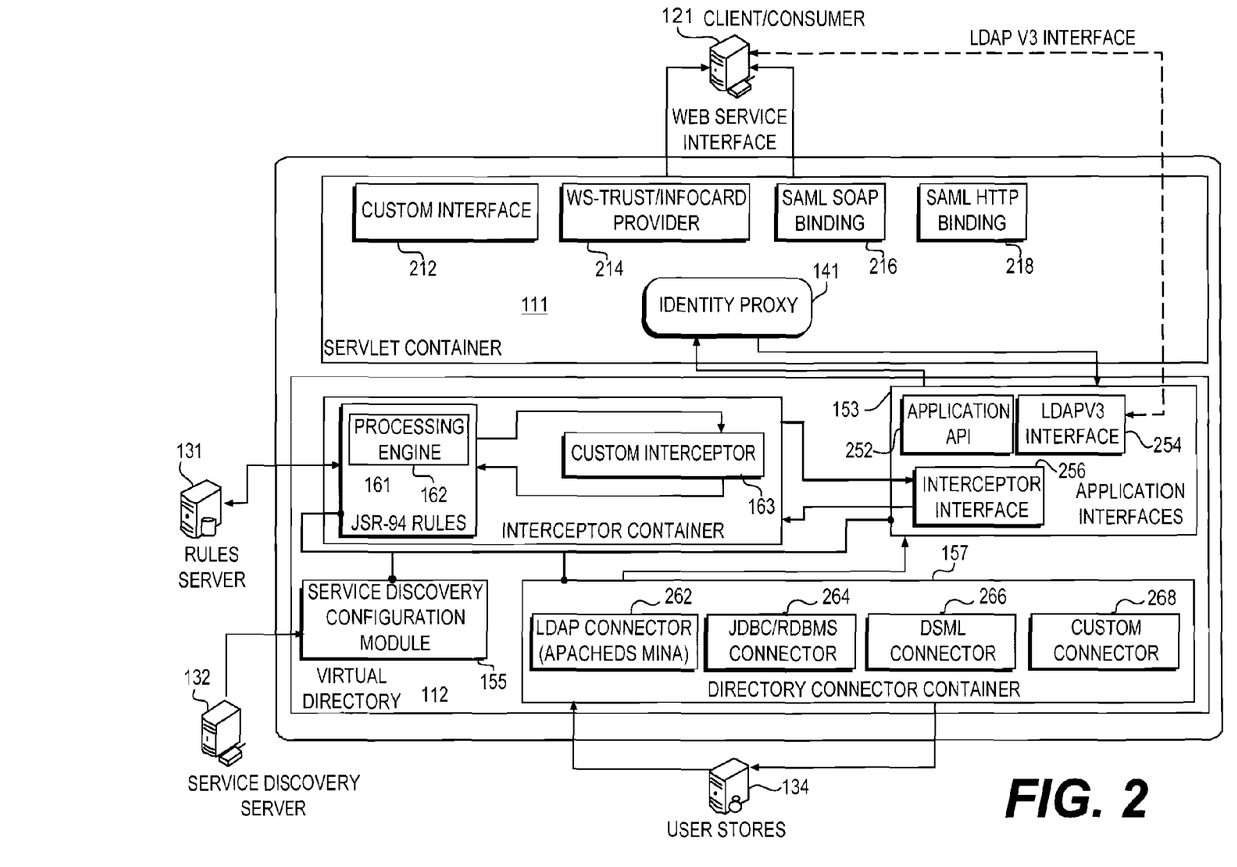
FIG. 2 is a diagram of the EIDO server architecture shown in FIG. 1, but with the servlet container, virtual directory server portions shown in greater detail.

The servlet container 111 is responsible for providing external interfaces to the internal application. While the servlet container is not a part of the VDS, connections between the VDS and servlet container can be established using identity proxy 141. The identity proxy 141 is a specialized component added to the servlet container to normalize communication between the servlet container and the application interfaces 153 of the VDS. This is shown in FIG. 2. By creating this proxy 141, any components of the servlet container 111 can be reused while only the identity proxy code must be re-written or modified to interact with the VDS. With this configuration, the VDS remains abstracted to the servlet components and thus can be replaced with minimal effort. The Java platform facilitates this communication innately.

Virtual directory servers 112 are servers that perform specific directory management and proxy functions. Virtual directory server 112 communicates with a rules server 131, a service discovery server 132 and user stores 134. Commercial examples of a VDS 112 that could be used include Penrose2™ and Radiant One™ manufactured by Radiant Logic, Inc., Novato, Calif.). However, the design of the EIDO server architecture is not dependent on the virtual directory service 112 product, as long as that VDS meets the functional needs of the EIDO architecture as described herein.

Virtual directory server 112 includes an interceptor container 151, application interfaces 153, service discovery configuration module 155 and directory connector container 157. Interceptor container 151 in turn includes a JSR-94 rules module 161 and a processing engine 162 for rules module 161, and also contains custom interceptor module 163, in communication with rules module 161.

Most VDS architectures include the interceptor container, application interfaces, and directory connector container as basic functionality built in, as shown in FIG. 1. Within the VDS, the interceptor container provides a means to introduce and execute additional functionality that is external to the application through the use of Custom Interceptors 163.

Referring again to the components of virtual directory 112, rules module 161 is in communication with external rules server 131. An external service discovery server 132 communicates with service discovery configuration module 155, and an external user stores 134 communicate with directory connector container 157. The reference implementation 113 of the EIDO server architecture was built using a Java™ platform, which implements a Java™ virtual machine. It is contemplated that alternatives to the Java™ platform may be used, either in lieu of the Java™ platform or in addition to the Java™ platform.

Within rules module 161, a JSR-94 Rules Wrapper provides an interceptor capability that allows for the inclusion of JSR-94 rules engine processing. JSR-94 is described at JSR 94: Java™ Rule Engine API (4 Aug., 2004, Sun Microsystems). A JSR-94 Rules engine (internal or external to the VDS application) can be used by the JSR-94 Rules Wrapper.

As the name implies, the custom interceptor module 163 implements any custom code introduced to the VDS. Interceptors can execute both before and after a query is sent. Intercepting before a query is sent allows the query to be modified by the interceptor 151 before the query is sent. Subsequently, a response from a user repository can be intercepted and thus modified before the response is sent to the client/consumer 121.

Application interfaces 153 comprise the generic container for the VDS standard functionality. Within the application interfaces there may exist additional components that allow for the extension of the application outside the scope of the application interfaces. There may be many application interfaces which may be defined, and the overall architecture is to keep extensibility of the system to a maximum. Likewise, the VDS may contain several interfaces for different types of interactions/external interfaces.

The directory connector container 157 is the interface between the VDS application and external user stores 134 and contains directory connectors. By default, most VDS applications come with both a set of built in connectors (262-266, FIG. 2) that interface with the user stores 134 to allow for transfer of user stores to the virtual directory server, for further delivery to the client/consumer 122. For the present invention, directory connector container 157 may also include a custom connectors 268 (See FIG. 2), which allows for incorporation of new interfaces that are written to new standard, which are not well-known or fully developed.

Service discovery configuration module 155 is a custom written module that extends the core functionality of the VDS to allow configurations to be loaded from a service discovery server instead of the standard configurations, which are typically locally residing configuration files.

Lower Level Architecture

Figure 3:
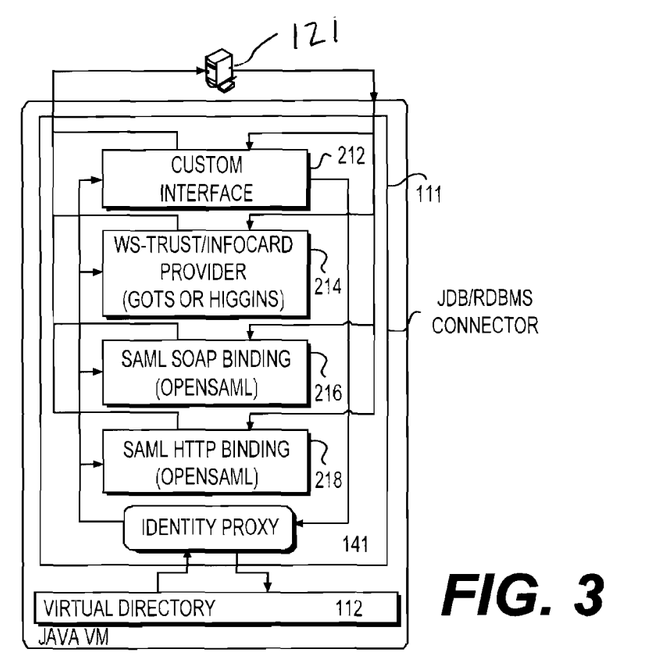
FIG. 3 is a diagram showing the interfaces between the servlet container and the VDS.
Figure 4:
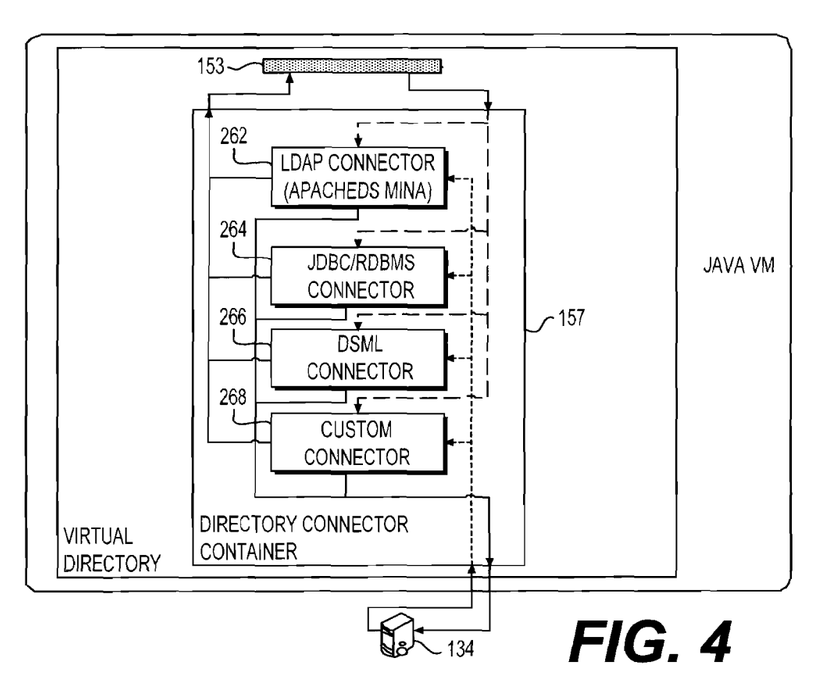
FIG. 4 is a diagram showing the connections between the directory connectors and the application interfaces for the server network shown in FIG. 1.

FIGS. 2-4 illustrate an exemplary low level architecture for the EIDO server 113 of FIG. 1 in greater detail. The architecture comprises servlet container 111 and a virtual directory server 112, as described previously. The lower level architecture identifies many of the sub-components within the architecture, as well as external components. Most of the functionality of the server architecture is within these sub-components.

Servlet container 111 includes a plurality of common interfaces that are written to common standard to transfer information from the EIDO architecture 113 to the client consumer 122. Specifically, servlet container 111 includes a WS-trust/information card provider 214, a SAML SOAP binding 216 and a SAML HTTP binding 218. Servlet container also includes a custom interface 212. A custom interface 212 is written to account for situations where a connector is needed that is compatible with an emerging standard that is not already included in the servlet container (see component parts 214, 216 and 218), to allow for interface between client/consumer 121 and servlet container 111.

In the virtual directory 112, the application interfaces 153 include an application API 252, an LDAPv3 interface 254 and an interceptor interface 256. The directory connector container 157 includes an LDAP connector 262, a JDBC/RDBMS connector 264, a DSML connector 266 and a custom connector 268. Custom connector 268 is used to allow for transfer of data from a user store 134 that is written to an emerging standard, or a standard not covered by LDAP, JDBC/RDBMS or DSML connectors 262, 264 or 268, respectively.

Application Interfaces

The application API 252 is the programming interface to the VDS core functionality which allows for direct access of the VDS capabilities.

LDAPv3 refers to version 3 of the LDAP specification. The VDS should maintain an external common and standard interface without the use of any servlet interfaces. Most VDS have an LDAPv3 interface 254, which is the most common interface for authentication of credentials. In this diagram, the native LDAPv3 interface is preserved and can be accessed by a client/consumer of the server architecture.

The interceptor interface 256 defines the programming interface between VDS 112 and Interceptor Container 151. During a process, interceptor interface 256 provides for selective interruption of the current processing flow to allow the EIDO server architecture to perform extra functionality or modifications to the current process, and then return to the process.

Servlet Container Interfaces

FIGS. 2 and 3 illustrate the connections of the servlet interfaces 212-218. The servlet container 111 is the most customized aspect of the EIDO architecture. Through the use of custom interface modules 212, many different interfaces can be created to allow access to the server architecture to support the latest technologies or specific user needs.

The server architecture reference implementation contains a WS-Trust InfoCard 214, and SAML Soap Binding 216, SAML HTTP Binding 218. (InfoCard™ 214 is the codename for Microsoft Windows CardSpace technology, April 2006, Microsoft Corporation).

Directory Connector Container and Directory Connectors

FIG. 4 is a diagram showing the connections of the directory connectors 262-268. Directory connectors 262-268 are modules, either included or created, that directly connect to external User Stores 134. The server architecture assumes an LDAP connector 262, relational database management system (RDBMS) connector or Java database connector (JDBC) 264, and Directory Service Markup Language (DSML) connector 266; additionally, custom connectors 268 may be created/added as needed or in some cases purchased as extras, depending on the VDS to account for new/emerging standards as mentioned above.

Operational Features

The operational features include interface normalization and service discovery integration. Interface normalization is the normalization of the LDAPv3 Interface for error codes and connection types. In the example configuration, Universal Description, Discovery; and Integration (UDDI) integration is used; however other types of service discovery may be implemented. Service Discovery integration results in a service discovery technology, like UDDI, as the underlying configuration mechanism. The service discovery configuration module is responsible for the interactions between the service discovery server and the virtual directory server 112.

UDDI is a specification for service discovery from the OASIS group (Please see uddi.xml.org, 24 Aug. 2006). Although UDDI is typically used for the discovery of SOAP-based Web Services, UDDI also supports the publication of a wide range of data. Integration of UDDI as a means of configuration presents many benefits to the EIDO server architecture from both functional and administrative viewpoints. But as noted, UDDI is used only as an example; UDDI is not the only service discovery capability that could be consumed by EIDO. Other Service Discovery technologies could be used in the place of UDDI. For example, Electronic Business Extensible Markup Language (ebXML) is another specification that supports Service Discovery (http://www.ebxml.org). Likewise, a variety of database, custom web service, or even alternative protocols can be utilized as a service discovery capability. Thus, the EIDO service discovery configuration module is extensible, which makes the EIDO architecture agnostic to the specific technology used for service discovery, while at the same time maintaining the principals of this integration.

Functional benefits include a single point of configuration, achieved by storing configuration of user repositories, used in the directory. The use of the connector container 157 results in many server architectures being able to retrieve the same configuration information for a user repository, thus supporting a federated group of server architectures that are distributed throughout a network.

User repositories can be published to UDDI and are then dynamically added to the server architecture. Notifications sent from UDDI enable the dynamic addition of these repositories. Dynamic discovery of service providers, rules engines, and other server architecture resources is also added through UDDI.

Dynamic rules configurations are implemented. Rules and configurations can be stored in UDDI and pushed/pulled from many server architectures dynamically. Dynamic addition of rules and configurations enables greater flexibility in the use of the server architecture within an organization or enterprise, especially one as dynamic as the Federal government.

Configuration items stored within UDDI are published once, but can be consumed many times, reducing the configuration requirements of the administrator. This provides multiple consumption points. UDDI configurations are less complex than XML configuration files or even plain text configurations.

Implementation normalization is provided by the server architecture. UDDI publication specification dictates the format and method of configuration information, regardless of the implementation of the server architecture. Should the server architecture be implemented with many different VDS products, the same configurations would work and the different products would be compatible, because the UDDI Configuration module for each VDS would know how to translate UDDI configurations for the server architecture into the local configuration.

UDDI Configuration Consumption: Execution Flow

Figure 5A:
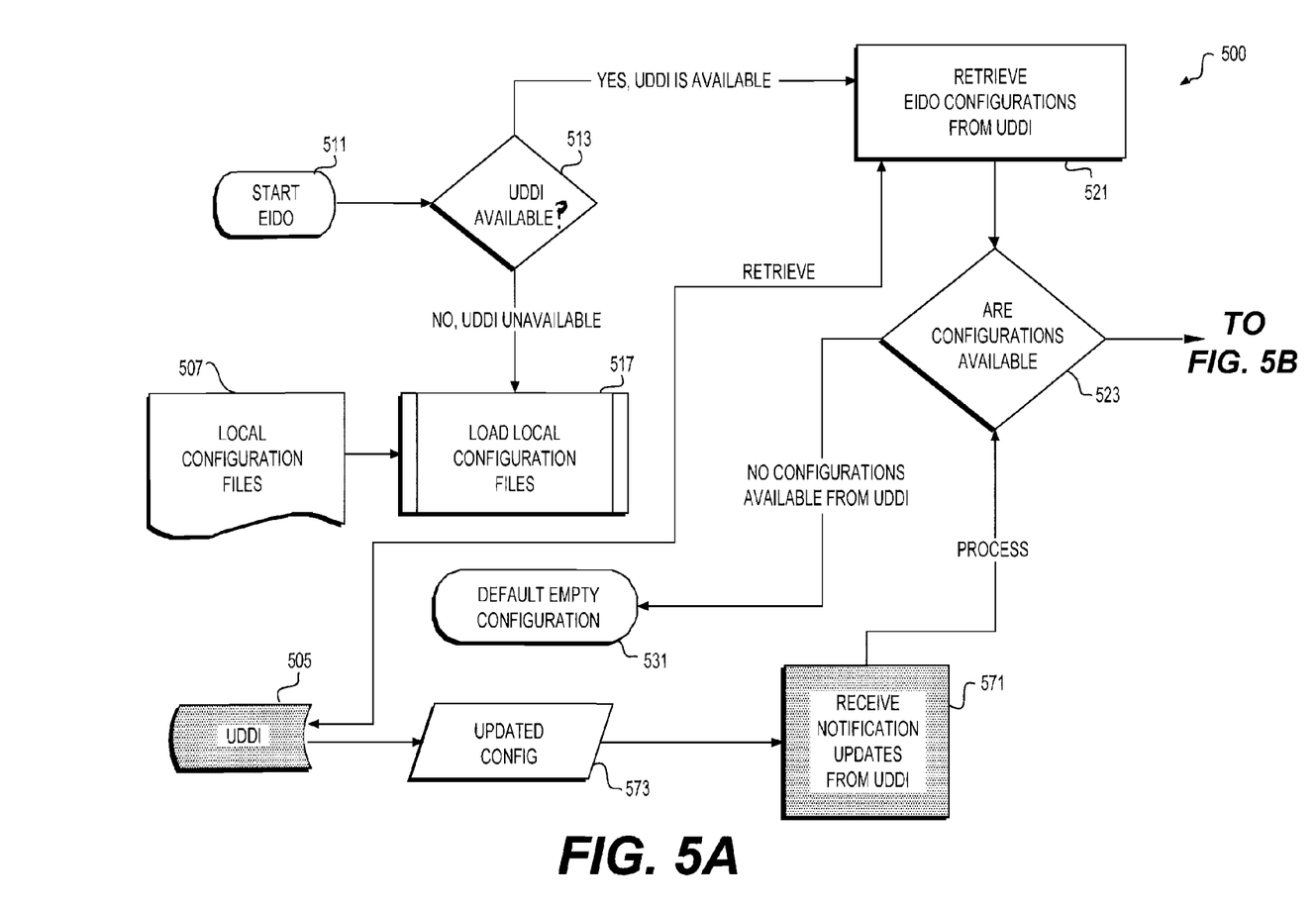
FIG. 5 is a service discovery configuration consumption flowchart.
Figure 5B:
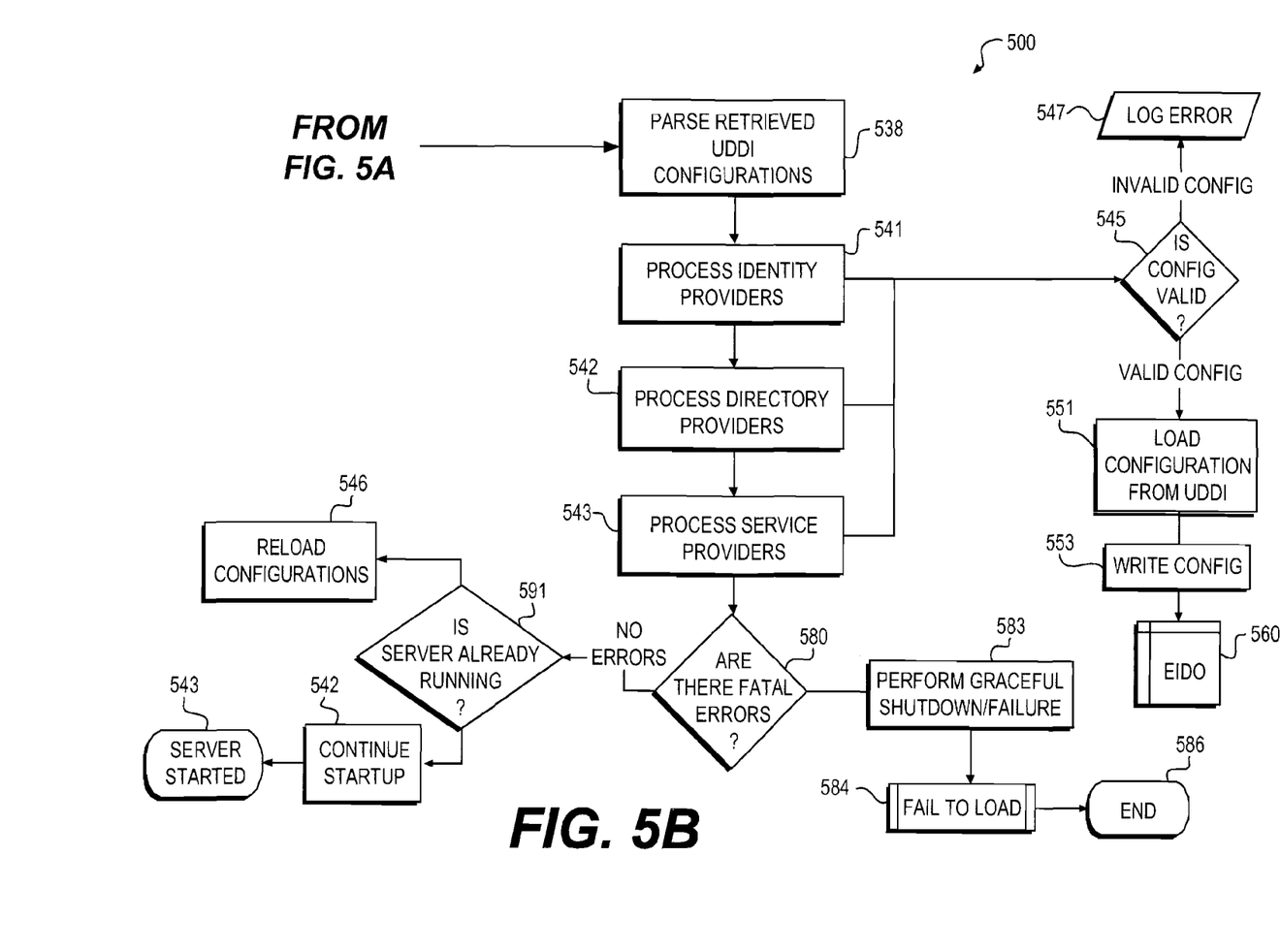

FIG. 5 is a UDDI configuration consumption flowchart 500 in which UDDI data 505 and local configuration files 507 are used. Referring to the flowchart, upon starting the server architecture (step 511), a determination (step 513) is made as to whether UDDI data 505 is available. If UDDI data is not available, local configuration files 507 are loaded (step 517). If UDDI is available, the server architecture configurations are retrieved (step 521) from directory container 157, and a determination (step 523) is made whether configurations are available. In the absence of available configurations, a default empty configuration is used (step 531). If configurations are available, retrieved UDDI configurations are parsed (step 538) and identity, directory and service providers are processed (steps 541-543). A determination (step 545) is made to determine if the configuration is valid. If the configuration is invalid, an error is logged (step 547). If the configuration is valid, the configuration is loaded (step 551) from UDDI 505. The configuration is then written (step 553) to provide the server architecture output (step 560).

The determination in step 523 whether configurations are available is made by receiving (step 571) updated configurations 573 from UDDI 505.

When the retrieved UDDI configurations are parsed (step 538) and identity providers are processed (steps 541-543), a determination (step 580) is made whether fatal errors are present. In the case of fatal errors, the process is shut down or otherwise reset (step 583) as a failure to load a configuration (step 584), terminating the process (step 586). If no fatal errors are present, a determination (step 591) is made whether the server is already running. If the server is not already running, startup is continued (step 592) and the server is started (step 593). If the server is not running, and valid configurations are found and no errors are present, the startup of the system continues, which involves the otherwise normal startup process of the VDS, as known to those skilled in the art of network configuration architecture. If the server is already running, the configurations are reloaded (step 596).

Referring again to FIG. 5, a process for operating the EIDO architecture is summarized (numbers in parentheses refer to reference characters for steps in FIG. 5). In the first step:

1. EIDO is launched from a cold state. (511)

2. EIDO attempts to contact UDDI: (513)
   2a. UDDI is available (proceed to 521)
   2b. UDDI is unavailable (proceed to 517)

3. If UDDI is unavailable, Load Local configuration Files (517) fed by (507)
   3a. Proceed to (523) to continue process.

4. Retrieve Configurations from UDDI. (521)

5. Are Configurations Available (523)
   5a. Yes, proceed to Parsing (538)
   5b. No, proceed to load Default empty configuration (531)

6. Alternate: Receives notification of updates from UDDI via Push (571), proceed to Parsing (538)

7. Parse Configuration received from UDDI (either from 5a or 6).

8. Repeat parsing and error handling for each type of Configuration (Identity Providers (541), Directory Providers (542) and Service Providers (543).

9. Optional: If during 8, errors are found, log the error and dump the configuration.

10. Load the configuration and write to EIDO (551 & 553), if a valid configuration is loaded from 8.

11. Optional: If there are fatal errors, perform graceful shutdown (583).

Figure 6:
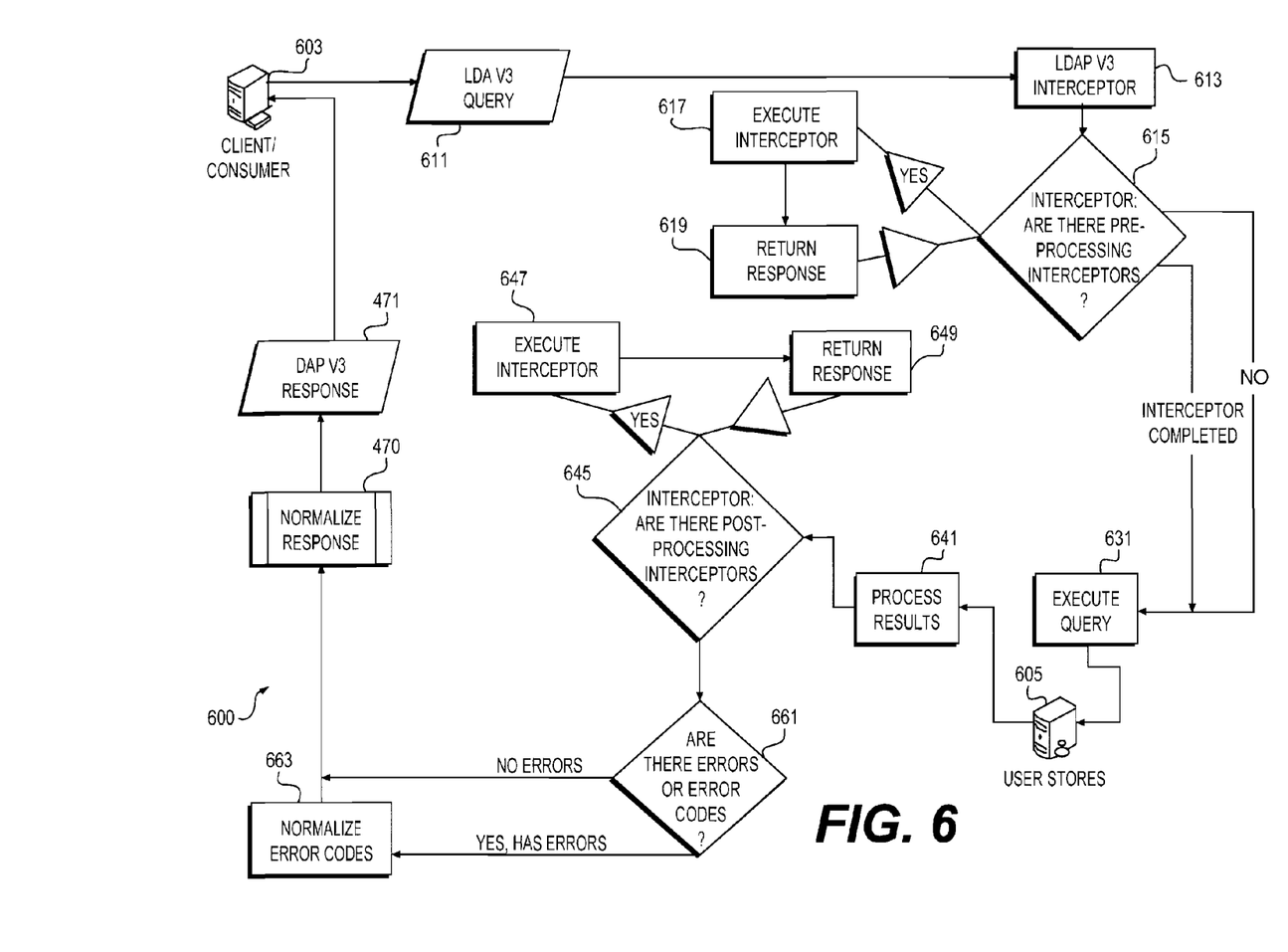
FIG. 6 is a flow diagram showing typical data flow control structures.

12. If the server is already running (591)
    12a. Yes, proceed to reload configurations dynamically as updates were received by step 6 (546)
    12b. No, continue normal start up (542)
    Service Discovery Configurations FIG. 6 is a flow diagram 600 showing a typical UDDI internal structure. The UDDI Registry contains at least one enterprise or business entity. In FIG. 6, a client, represented at 603, provides LDAP queries to user stores, represented at 605, and receives LDAP responses. To do this, the client 603 makes a LDAP query (step 611), which is received at an LDAP v3 interface (step 613). A determination (step 615) is made whether there are pre-processing interceptors. In the case of pre-processing interceptors, the interceptor is executed (step 617) and a response is returned (step 619). After no pre-processing interceptors remain, the query is executed (step 631), and provided to user stores 605.

The user stores 605 process results (step 641) provide the results as an output. Before returning back to client/consumer 603, a determination (step 645) is made as to whether there are post-processing interceptors. In the case of post-processing interceptors, the interceptor is executed (step 647) and a response is returned (step 649). After no post-processing interceptors remain, a determination (step 661) is made as to whether there are errors. In the case of errors, the resultant error codes are normalized (step 663). In either case (whether or not there are errors), the response from the user stores 605, interceptors (step 649) or normalized error codes (step 663) are normalized (step 670) to provide a LDAP v3 response (step 671) to the client 603.

Figure 7:
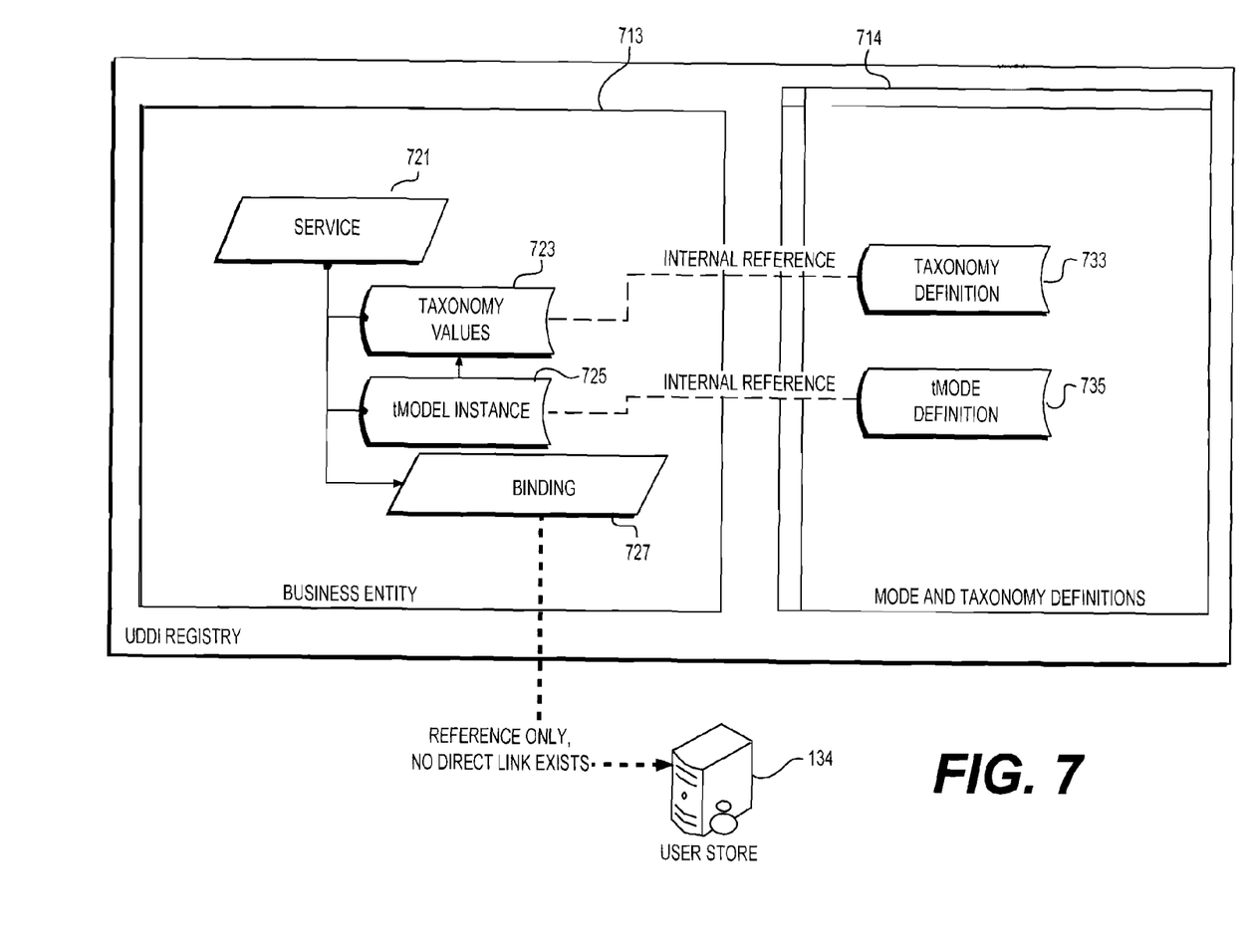
FIG. 7 is a diagram of a generic UDDI service structure which serves as the service discovery mechanism for the server network shown in FIG. 1.

FIG. 7 describes how specific server architecture configuration items are stored within the UDDI registry through the use of tModels and Taxonomies. The server architecture UDDI Configuration Module associates the UDDI of a tModel/Taxonomy to a specific configuration item. This allows multiple configuration items to be associated with a service. Because the UDDI Configuration Module is responsible for associating specific tModels with configuration items, UDDI publications are not dependent on any specific VDS product or configuration schema. FIG. 7 is a diagram showing an example UDDI configuration. A UDDI registry 711 includes an enterprise or business entity 713 and definitions 714. The enterprise or business entity 713 includes service information 721, taxonomy values 723, a tModel instance 725 and a binding 727. The taxonomy values are linked to the definitions 714, specifically to a taxonomy definition 733. The tModel instance is linked to the definitions 714, specifically to a tModel definition 735. A tModel is a data structure to UDDI that refers to a specific value or set of values. tModels can be created to relate to specific configuration values, interface parameters, and other configuration items as needed by the system.

UDDI Configurations for the server architecture exist for three primary entities: identity providers, directory providers, and service providers. A checked Taxonomy8 (tModel) exists to identify services as the server architecture identity providers, the server architecture directory providers, and the server architecture Service Providers.

The server architecture identity providers is the special label given to server architectures stored within UDDI.

The server architecture directory providers is the special label given to user repositories published for consumption by the server architecture.

The server architecture service providers are the special labels given to service providers that will be consumed by the server architecture.

Aside from the taxonomy for the server architecture entities, there are many more taxonomies that are utilized to represent configuration items. The server architecture does not distinguish between business entities nor does it use business entities to identify any specific notation or information. The UDDI registry also contains published Taxonomy and tModel definitions. These definitions can be reused during publication of services, business entities, and bindings, and other tModels.

CONCLUSION

It will be understood that many additional changes in the details, materials, steps and arrangement of parts, which have been herein described and illustrated to explain the nature of the invention, may be made by those skilled in the art within the principal and scope of the invention as expressed in the appended claims. Thus, while the EIDO architecture and methods of the present invention, as herein shown and described in detail, is fully capable of obtaining the objects and providing the advantages above stated, it is to be understood that the presently preferred embodiments are merely illustrative of the invention. As such, no limitations are intended other than as defined in the appended claims.

What is claimed is:

1. A server, said server comprising:
    at least one Joint Technical Architecture (JTA) compliant server component, said JTA compliant server component including a processor which is configured with a servlet container containing at least one client interface and an identity proxy for transfer of information to a client;
    at least one JTA compliant virtual directory server component, said JTA compliant virtual directory server component including an interceptor container in communication with a JTA compliant remote rules server component having a business rules layer which allows declarative modification of user information using plain English language and a directory connector container in communication with a remote user stores database for access of user stores; and, at least one JTA compliant server component which includes a service discovery configuration module integral to said JTA compliant virtual directory server component for providing online updates to definitions about said user stores.

2. The server of claim 1, wherein said service discovery configuration module has a UDDI configuration.

3. The server of claim 1, wherein said service discovery configuration module has a ebXML configuration.

4. The server of claim 1, wherein said interceptor container further comprises:
    an internal rules engine for processing business rules from said remote rules server; and,
    a custom interceptor for selectively performing operations in response to said internal rules engine.

5. The server of claim 1 wherein said servlet container client interfaces are selected from the group consisting of SAML SOAP binding, SAML HTTP binding, WSTrust/Infocard Provider and custom interfaces.

6. The server of claim 1 wherein said directory container interfaces are selected from the group consisting of LDAP Connectors, JDBC/RDBMS connectors, DSML connectors and custom connectors.

7. The server of claim 1 wherein said virtual directory server includes an application interface, and further wherein said system includes a Lightweight Directory Access Protocol (LDAP) directory access protocol capable of maintaining an external interface between said client and said application interfaces for authentication of credentials.

8. A Joint Technical Architecture (JTA) compliant server architecture including a processor configured with software for accomplishing a method comprising steps of:
    A) providing a JTA compliant servlet container for interfacing with a client, said servlet container including at least one client interface and an identity proxy for transfer of information to said client;
    B) affording a JTA compliant virtual directory server, said JTA compliant virtual directory server including an interceptor container in communication with a JTA compliant remote rules server and a JTA compliant directory connector container in communication with a remote user stores database for accessing user stores; and,
    C) maintaining service discovery configuration with a JTA compliant service discovery configuration module, said service discovery configuration being integral to said virtual directory server.

9. The server architecture of claim 8 wherein said server architecture is configured with software wherein step A) is accomplished with a client interface that is selected from the group consisting of a SAML SOAP binding, a SAML HTTP binding, a WS-Trust/Infocard Provider, and a custom interface.

10. The server architecture of claim 8 wherein said server architecture is configured with software wherein step B) is accomplished with a directory container interface that is selected from the group consisting of LDAP Connectors, JDBC/RDBMS connectors, DSML connectors and custom connectors.

11. The server architecture of claim 8 wherein said server architecture is configured with software wherein step C) is accomplished by accessing a remote service discovery server while said architecture is online.

12. The server architecture of claim 8, wherein said service discovery configuration module in step C) has a UDDI configuration.

13. The server architecture of claim 8, wherein said service discovery configuration module in step C) has an ebXML configuration.

* * * * *